United States Patent [19]

Reinsma

[11] 4,284,281
[45] Aug. 18, 1981

[54] JOINT SEALING STRUCTURE
[75] Inventor: Harold L. Reinsma, Dunlap, Ill.
[73] Assignee: Caterpillar Tractor Co., Peoria, Ill.
[21] Appl. No.: 174,391
    PCT Filed: Feb. 19, 1980
[86] PCT No.: PCT/WS80/00166
    § 371 Date: Feb. 19, 1980
    § 102(e) Date: Feb. 19, 1980
[51] Int. Cl.³ .................. F16J 15/32; F16J 15/36
[52] U.S. Cl. .................................. 277/84; 277/95;
    277/152; 277/165; 277/166; 305/11
[58] Field of Search ...................... 277/38–43,
    277/81 R, 84, 85, 92, 95, 152, 153, 165, 166,
    181, 186; 305/11-13

[56] References Cited
U.S. PATENT DOCUMENTS

| | | | |
|---|---|---|---|
| 2,657,080 | 10/1953 | Johnson et al. | 277/9 |
| 3,086,781 | 4/1963 | Hudson et al. | 277/84 |
| 3,110,097 | 11/1963 | Yocum | 277/9.5 |
| 3,614,113 | 10/1971 | Burk | 305/11 |

FOREIGN PATENT DOCUMENTS

| | | | |
|---|---|---|---|
| 813226 | 9/1951 | Fed. Rep. of Germany | 277/153 |
| 872707 | 4/1953 | Fed. Rep. of Germany | 277/95 |
| 2808159 | 9/1979 | Fed. Rep. of Germany | 305/11 |
| 1025884 | 4/1966 | United Kingdom | 277/153 |

Primary Examiner—Robert S. Ward
Attorney, Agent, or Firm—Wegner, Stellman, McCord, Wood & Dalton

[57] ABSTRACT

A joint sealing structure (12) including an annular seal ring (23) having a sealing portion (28) provided with a sealing lip (31) having a dynamic seal engagement with a joint member sealing surface (18) at all times. The sealing portion is carried on a connecting portion (30) of the seal ring which, in turn, is provided with a base portion (29) mounted in the counterbore of the seal space (15). The stiffener (26) is connected by a connecting portion (27) to a base (25) press fitted in the counterbore surface (20). The base defines an inturned flange (35) providing a bearing for a Belleville spring (24). The Belleville spring is provided with a radial inner portion engaging projecting portions (33) of the stiffener for biasing the sealing portion (28) and lip (31) thereof axially toward the sealing surface (18). The diaphragm is a one-piece element including the stiffener, connecting and base portions and stiffener portion (26) is molded integrally into the sealing portion (28) of the seal ring. The stiffener may be provided with a plurality of distributed openings (38) for providing a positive mechanical bond of the molded sealing portion (28) to the stiffener (26). The Belleville spring may be arranged to pass over center in the range of axial movement between the joint members so as to provide an effectively flat spring rate and thereby provide a stabilized sealing force of the lip (31) against the sealing surface (18).

10 Claims, 3 Drawing Figures

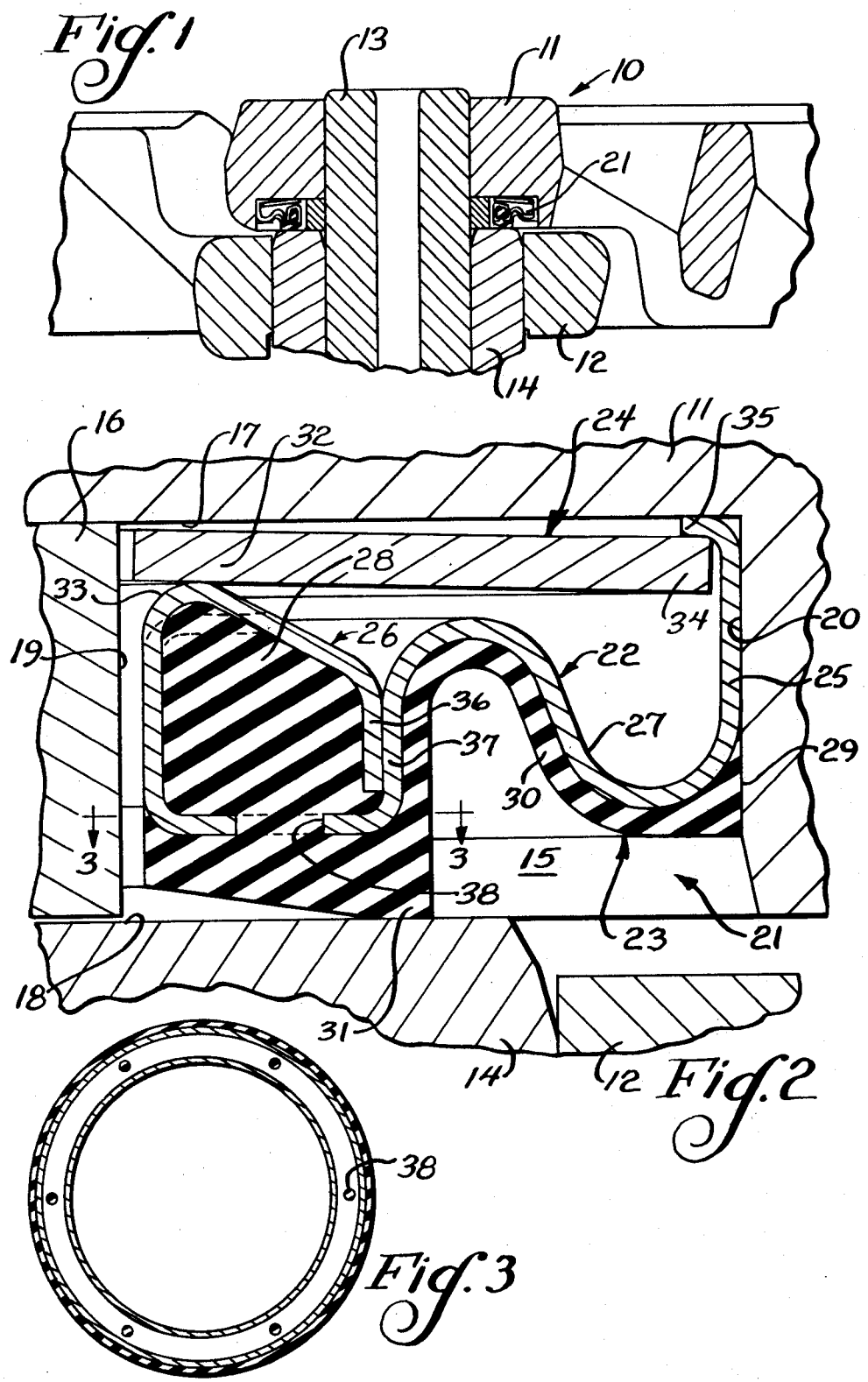

JOINT SEALING STRUCTURE

DESCRIPTION

1. Technical Field

This invention relates to seals and in particular to boot-type face seals having associated spring means for maintaining sealing engagement thereof.

2. Background Art

In U.S. Pat. No. 3,614,113 of Duane L. Burke, which patent is owned by the assignee hereof, a boot-type seal is shown for use in sealing a track pin assembly. The seal includes Belleville spring means for biasing opposed portions of the boot into sealing engagement with confronting surfaces of the members to be sealed. The legs of the boot engaged by the opposed Belleville springs are resilient and a bight portion of the boot provides a static seal with a radially outer surface of one of the members to be sealed.

In U.S. Pat. No. 3,269,738, Herman Baumler et al show a seal for use in rotary piston motors wherein a disc spring is embedded in an elastic body and removably connected with a glide ring. The disc spring may be radially slotted.

In U.S. Pat. No. 3,370,895 of George A. Cason, Jr., a seal is shown for use with drilling bits wherein a spring is provided within a rubber sealing ring. The sealing ring, in turn, is bonded to a resilient holding ring. Other patents of less pertinency, while showing a number of different forms of seals, are those of George E. Dunn U.S. Pat. No. 2,338,169; F. W. Koller U.S. Pat. No. 2,481,430; Bernard F. Kupfert et al U.S. Pat. No. 2,814,513; Fred E. Simpson et al U.S. Pat. No. 3,050,346; Harold L. Reinsma U.S. Pat. No. 3,218,107, which patent is owned by the assignee hereof; Seisakusho British Pat. No. 1,425,364; and Japanese Pat. No. 131,725.

DISCLOSURE OF INVENTION

The present invention comprehends an improved joint sealing structure wherein an annular stiffener is associated with the sealing portion of a seal ring. The stiffener comprises a portion of a flexible annular metal diaphragm having a flexible connecting portion extending from a base portion. The seal ring includes a flexible connecting portion complementary to the connecting portion of the metal diaphragm element.

The stiffener portion of the diaphragm element may be embedded in the sealing portion of the seal ring.

In the illustrated embodiment, the stiffener portion defines a box section wherein the diaphragm element is formed to define a looped section enclosing a portion of the seal ring sealing portion.

Spring means may be provided for biasing the lip of the sealing portion sealingly against the confronting joint member, and in the illustrated embodiment, the spring means comprises Belleville spring means acting on the stiffener.

The stiffener is arranged so as to transmit the spring biasing force directly to the lip portion and provide an improved stabilized seal notwithstanding a substantial range of movement coaxially between the joint members being sealed.

The metal diaphragm may include a turned, inner portion against which the radially outer portion of the Belleville spring means abuts so as to provide improved free spring movement in the seal structure.

The Belleville spring means may be arranged to deflect past the flat position of the spring in the range of movement between the joint members so as to effectively minimize the variation in spring force effected by the spring means over such range of movement thereby to provide an improved stabilized sealing engagement of the seal ring lip portion with the confronting joint member.

A radially outer portion of the seal ring may define a static seal with the other joint member.

The stiffener portion of the diaphragm may be secured to the sealing portion of the seal ring by means of a plurality of openings in the stiffener portion with the sealing portion of the seal ring being molded therethrough.

The seal ring further serves as means for protecting the metal diaphragm from the ambient atmosphere as the sealing ring extends and is sealed to the joint members outwardly of the diaphragm.

The sealing ring may be formed of a resilient abrasion-resistant sealing material, such as a synthetic resin or elastomeric material.

Thus, the sealing joint utilizes a single piece of thin, high modulus material (preferably steel) arranged in a coaxial manner, having an essentially close-sided formed torque box, blending into a circumferentially convoluted diaphragm having high torsional rigidity, while being axially flexible, with a base press fitted into a bore (radial inner surface) to provide positive seal face drive and static sealing. It then extends to an inward projecting flange. This flange permits a preassembled tamper-proof cartridge unit and acts as a wear resistant spacer for deflection past flat position for the Belleville spring.

Onto this formed high modulus coaxial section thus described, a wear resistant sealable synthetic resin, plastic or elastomeric material is molded and bonded onto the diaphragm material to protect it from corrosive and abrasive attack, and simultaneously into and on the bushing side of the torque box with suitable holes or perforations of the face of the torque box to augment and assure positive attachment of the seal face with the main body of the torque box.

The base and the connecting portion of this seal assembly are in static sealing press fit contact with the radial inner surface. Since the connecting portion, seal ring, sealing portion, and lip portion are integral, no external bond is exposed to external elements which could induce leakage.

Thus, the joint sealing structure of the present invention is extremely simple and economical of construction while yet providing an improved stabilized seal between axially movable joint members.

BRIEF DESCRIPTION OF THE DRAWING

FIG. 1 is a fragmentary section of a joint having an improved sealing structure embodying the invention;

FIG. 2 is a fragmentary enlarged section illustrating the sealing structure in greater detail; and FIG. 3 is a transverse section taken substantially along the line 3—3 of FIG. 2.

BEST MODE FOR CARRYING OUT THE INVENTION

In the exemplary embodiment of the invention as disclosed in the drawing, a joint generally designated 10 comprises a track joint wherein a first track link 11 is movably connected to a second track link 12 by means of a pin 13 having an axial portion rotationally fitted in a bushing 14 and an axial portion press fitted within the link 11, as shown in FIG. 1. Link 11 and bushing 14 cooperatively define an annular seal recess generally designated 15 extending coaxially about pin 13. A thrust ring having a radially outer surface 19 extends coaxially about the pin between an axially inner surface 17 of link 11 and an axially outer surface 18 of the bushing 14. The radially outer surface 19 of the thrust ring cooperates with a radially inner cylindrical surface 20 of the link 11 defining the radially outer end of seal space 15 and defining the annular extent of the seal space.

Referring now more specifically to FIG. 2, the invention comprehends the provisions of an improved sealing structure generally designated 21 for movably sealing the joint members 11 and 14 defined by the link 11 and bushing 14, respectively, during axial movement of the bushing 14 relative to the link as may occur in the normal operation of the track. As shown, the sealing structure includes a flexible annular metal diaphragm generally designated 22, an annular seal ring generally designated 23, and biasing spring means generally designated 24.

Diaphragm 22 includes a radially outer base portion 25 which is fitted into the recess 15 in abutment with the link surface 20. The diaphragm further includes a radially inner stiffener portion generally designated 26 and a flexible curvilinear connecting portion 27 extending between the stiffener portion 26 and base 25.

As shown in FIG. 2, the diaphragm stiffener portion 26 is embedded in a sealing portion 28 of seal ring 23 which is connected to a radially outer base portion 29 thereof by a flexible connecting portion 30.

Sealing portion 28 of the seal ring further defines a lip portion 31 sealingly engaging the bushing surface 18. Lip portion 31 is biased against surface 18 by the spring means 24 which, as shown in FIG. 2, may comprise annular Belleville spring means having a radially inner portion 32 engaging a plurality of projecting portions 33 of the stiffener 26 to apply a spring biasing force through the stiffener 26 to the lip 31. The radially outer portion 34 of the Belleville spring 24 abuts an inturned flange 35 of the diaphragm base 25 so as to permit free spring movement at all times.

As further seen in FIG. 2, the stiffener portion 26 comprises a looped radially inner portion of the diaphragm 22 which effectively defines a box section with the distal end 36 of the stiffener portion engaging a cylindrical portion 37 connecting the stiffener portion to the diaphragm connecting portion 27. Thus, the stiffener is, in effect, embedded in the seal ring sealing portion 28 so as to provide a firm connection between the seal ring and diaphragm. To provide further positive securing of the seal ring and diaphragm, the stiffener portion may be provided with a plurality of circumferentially spaced openings 38 through which sealing portion 28 may be molded. As shown in FIG. 3, six such openings 38 are provided for uniformly circumferentially distributing securing means.

In the illustrated embodiment, the diaphragm may be formed of a strong material, such as steel, while yet having a thin wall construction providing the curvilinear connecting portion the desirable flexible connection of the stiffener portion 26 to the base portion 25. The seal ring may be formed of a resilient, abrasion-resistant sealing material, such as synthetic resin or elastomeric material, one example thereof being polyurethane. The Belleville spring means 24 may comprise a conventional annular Belleville spring which is arranged in the seal structure 21 so as to deflect past the flat position over the range of movement of bushing 14 coaxially of link 11. As shown in FIG. 2, in the axially outermost position of the bushing 14 relative to the link, the spring is urged axially outwardly to adjacent the link surface 17. When relative movement between the link 11 and bushing 14 occurs so as to increase the axial extent of the space 15, spring 24 urges the stiffener portion 26 axially inwardly so as to maintain the desirable sealing engagement of lip 31 with the bushing sealing surface 18 and thereby provide an effectively stabilized dynamic seal between the sealing ring 23 and the bushing.

Base portion 29 of the sealing ring 23 and the press fit of base 25 in the surface 20 effectively provide a static seal to the link 11 at all times. Further, the connecting portion 30 of the seal ring extending complementarily to the connecting portion 27 of the diaphragm protects the diaphragm against corrosion from the atmosphere to which the seal space 15 opens axially inwardly and radially outwardly between the members 11 and 12.

INDUSTRIAL APPLICABILITY

The sealing structure of the present invention is advantageously adapted for use in a wide range of applications wherein axial and rotational movement occur between two joint members in the presence of abrasive materials. The sealing structure provides an improved dynamic seal with one of the members which is effectively maintained by directing a spring force through a stiffener formed integrally with a connecting portion and base and complementarily mounted to the seal ring to provide an improved readily installed cartridge-type sealing structure.

The overcenter frustoconical Belleville spring provides a relatively constant spring force over the range of relative movement between the joint members so as to provide an improved maintained effective sealing of the lip 31 with the sealing surface 18.

The stiffener 26 effectively defines a torque box. As the stiffener is connected by an annular connecting portion 27 to the base 25 which is sealingly fitted in the link 11, a second static seal is provided. In the illustrated embodiment, the diaphragm base portion 25 is press fitted into the counterbore of the link 14 defining recess 15 so as to provide a positive static seal therebetween.

In the illustrated embodiment, the sealing structure has been illustrated relative to a track joint. As will be obvious to those skilled in the art, the improved stabilized seal may be utilized in a wide range of additional industrial applications where relative axial movement occurs between the joint members to be sealed.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a joint (10) including a first member (11) defining a cylindrical axially outwardly opening recess (15) having an axially outer surface (17) and a radially inner, circumferential surface (20), a second member (14) adjacent said first member and defining a sealing surface (18) confronting said recess, said members being associated to have relative rotational movement about the axis of the recess and relative movement toward and from each other along said axis, an improved sealing structure (21) in said recess movably sealing said members, comprising:

an annular seal (23) having a radially outer base portion (29) received coaxially in said recess (15), an annular sealing portion (28) defining a lip (31) sealingly engaging said confronting sealing surface (18), and a flexible connecting portion (30) extending between said base portion (29) and sealing portion (28) for movably supporting said sealing portion;

a flexible annular diaphragm (22) having a radially outer base portion (25) received coaxially in said recess (15) axially outwardly of said seal base portion and in sealing engagement with said circumferential surface (20) of said recess, a stiffener portion (26) operatively connected to said seal sealing portion (28) and defining an axially outer portion (33) exposed axially outwardly of said seal sealing portion (28), and said axially flexible connecting portion (27) extending between said diaphragm base (25) and sealing portion (28) axially outwardly of said seal connecting portion (30); and spring means (24) coaxially in said recess and acting between said first member and said stiffener portion to urge said lip into maintained movable sealed engagement with said confronting surface.

2. The joint sealing structure (21) of claim 1 wherein said flexible portions (30,27) of said seal and diaphragm comprise curvilinear portions.

3. The joint sealing structure (21) of claim 1 wherein said axially flexible portions (30,27) of said seal and diaphragm comprise facially engaged curvilinear portions.

4. The joint sealing structure (21) of claim 1 wherein said diaphragm base portion (25) further includes a radially inwardly extending flange (35) operatively disposed between said axially inner surface (17) and said spring means (24,34).

5. The joint sealing structure (21) of claim 1 wherein said seal sealing portion (28) is resilient and said stiffener portion (26) of the diaphragm resiliently encloses a portion of said sealing portion.

6. The joint sealing structure (21) of claim 1 wherein said stiffener portion (26) of the diaphragm is provided with a plurality of through openings (38), said seal sealing portion (28) extending through said openings.

7. The joint sealing structure (21) of claim 1 wherein said stiffener portion (26) of the diaphragm comprises a looped wall having overlapping portions (36,37) and enclosing a portion of the seal sealing portion (28).

8. The joint sealing structure (21) of claim 1 wherein said seal base portion (29) comprises a flared end of said flexible portion (30), said seal flexible portion (30) comprising a thin wall section.

9. The joint sealing structure (21) of claim 1 wherein said stiffener portion (26) of the diaphragm comprises a looped wall having overlapping portions (36,37) embedded in said sealing portion (28), said stiffener portion (26) of the diaphragm being provided with a plurality of through openings (38), said seal sealing portion (28) extending through said openings.

10. The joint sealing structure (21) of claim 1 wherein said spring means (24) comprise a Belleville spring means movable past its flat position portion in the range of relative axial movement between said members.

* * * * *